UNITED STATES PATENT OFFICE

HENRY TEYNHAM WOODWARD, OF BERKELEY, CALIFORNIA, ASSIGNOR TO BURNHAM CHEMICAL COMPANY, OF RENO, NEVADA, A CORPORATION OF NEVADA

PROCESS OF RECOVERING ALKALI METAL SALTS FROM BRINES

No Drawing. Application filed June 3, 1929. Serial No. 368,202.

My invention relates to the recovery and purification of salts from complex brines of artificial or of natural origin such as the brine found at Searles Lake in California.

It is the usual procedure to recover the salts present in the brine by causing a state of supersaturation to become existent therein with respect to the salts present through suitable concentration and temperature variations of the brine. As the saturation of the brine increases in degree the salts crystallize out, reducing the concentration of the brine. Depending upon the physical conditions and the initial character of the brine, the salts are recovered in various degrees of purity. It follows that if a relatively pure salt is to be recovered from a brine an exactness of control of the temperature and concentration must be effected. This usually necessitates the provision of extensive equipment of such a nature that the process becomes involved. Even then the recovered salts are not of the purest form. While the problem presented may appear to be merely one for purely technical skill it has nevertheless baffled those in the art for a considerable length of time and numerous processes have been brought forth for purifying the various crystallized salts upon their recovery from the brine.

It is an object of my invention to devise a simple process for the recovery of pure salts from a brine.

A further object of the process of my invention is to recover a substantially pure salt from a complex mixture of salts.

A further object of my invention is to provide a process for separating a mixture of crystallized salts into its constituents in a substantially pure form.

Other objects of my invention will appear in the following specification where I have disclosed a preferred form of the purification process of my invention. It is to be understood that the invention, as defined by the claims, is to be accorded a range of equivalents consistent with the state of the prior art.

The preferred form of the process of my invention, which I am here disclosing, has been practiced upon the brine recovered from Searles Lake, California. As is well known Searles Lake is located and is subjected to such physical conditions as render the processes of recovering the constituents of the brine expediently practiced by means of the temperatures which naturally occur there. These processes have been described in numerous United States patents which have issued to George B. Burnham and of which mention is made of the following: No. 1,286,932, No. 1,328,416, No. 1,328,418, No. 1,424,447, No. 1,487,046. Under other less favorable physical conditions it is, of course, practical to conduct these processes with artificial heat exchanging means.

The process of my invention is characterized as comprising crystallizing the salts and treating the salt crystals to separate the salts from one another in such a manner that the individual salts are recovered in substantially pure form. I shall preferably describe the process as conducted on Searles Lake brine.

The salts in Searles Lake brine have various solubility characteristics; some have an increasing solubility with increasing temperatures; others have practically constant solubilities for any temperature variation; and others have solubilities which decrease with increasing temperatures. These characteristics vary with the individual salt and vary through various temperature ranges.

I have discovered that the solubility characteristics of the salts are relatively of such degree that the salts can be separated one from the other by virtue of the difference in their solubility characteristics. While the solubilities of the salts have been utilized for other purposes in connection with their recovery from brines, these characteristics have never been utilized in the novel manner hereinafter set forth.

With a mixture of salts recovered from Searles Lake brine consisting of sodium chloride and potassium chloride the solubility of sodium chloride in water increases from substantially 35.7 grams per 100 c. c. at 0° C. to only 39.8 grams per 100 c. c. at 100° C. while the solubility of potassium chloride for the same temperature range increases from 28.5 to 56.6 grams per litre. It is to be noted that the solubility of sodium chloride is thus substantially constant irrespective of the temperature of the water with which it is in contact. On the other hand the solubility of potassium chloride is practically doubled upon an increase in temperature of 100° C.

With a mixture consisting of glaserite and borax the amount of water necessary at 25° C. to dissolve one gram of glaserite (considered as potassium sulphate) will dissolve only 0.24 of a gram of borax while at a 100° C. over ten times as much borax (about 2.71 grams) will be dissolved.

Salt mixtures, such as those above, are readily secured from the brine at Searles Lake. This brine is usually treated in accordance with the known processes, such as are revealed in the before mentioned patents to George B. Burnham, to secure the precipitation of the several salts from the crude brine under the desired conditions. Instead of initially attempting to control the precipitation of these salts from the brine I have found it expedient in some instances to cause their general precipitation from the brine. Thus the brine is heated to a temperature at which evaporation takes place readily until the brine is suitably concentrated. During this interval certain salts precipitate, while other of the salts remain in solution. Upon cooling the brine those salts with decreasing solubility characteristics with respect to temperature readily precipitate from the brine as it becomes supersaturated with respect to them. After their precipitation the mixed salts are readily removed to be subsequently treated in the manner set forth hereinafter.

In the recovery of borax the precipitated salts are apt to contain impurities such as carbonates. I have found it expedient to remove these impurities by converting them to salts having a more soluble radical in combination than the carbonate radical. This conversion I prefer to accomplish by means of the processes disclosed in the copending applications Serial Numbers 332,463 and 387,567.

In treating a complex salt mixture consisting of sodium chloride, borax and glaserite, I prefer to first wash the mixture with cold water. The water should not be too cold or some of the sodium sulphate will be converted into Glauber's salt and, in this connection, I have found that a temperature of 15° C. is expediently employed. The borax and glaserite are relatively insoluble at this low temperature and, since the solubility of sodium chloride does not vary substantially with the temperature, it is substantially washed out of the mixture. Thus the crude salts are preferably introduced into some suitable means as an agitator where they are sprayed and washed with cold water. The crystals are then removed from the agitator into a filter wherein the wash water containing sodium chloride is removed from the glaserite and borax crystals. The filtrate containing substantially only sodium chloride is then conveniently concentrated in an evaporating pond where the sodium chloride is recovered. The crude glaserite and borax salts are expediently introduced into a second agitator wherein they are contacted with water to dissolve out the borax.

While the solubility of both these salts increases with the temperature the relative increase is greater in the case of borax, and, accordingly, I prefer to dissolve this salt out. Water having a temperature of 75° to 100° C. usually suffices and it is preferable that the time of contact be short inasmuch as the glaserite has an appreciable solubility. The glaserite and borax are subsequently introduced into a filter where the dissolved borax is filtered out leaving pure glaserite crystals.

The hot solution of borax is conveniently passed in heat exchange relationship to the water used to wash the crude mixture of glaserite and borax. Upon removal of the filtrate from the heat exchange it is passed to a spray pond or other means where the solution is cooled, the borax being finally recovered in a substantially pure form. To free the glaserite crystals of adhering mother liquor I preferably wash the crystals in the filter with fresh water. This fresh water, containing the mother liquor, is then introduced into the borax containing filtrate previously removed from the glaserite crystals.

Since dilution of the borax containing filtrate is desirable to prevent the precipitation of the glaserite in the filtrate and so that the borax in the form of decahydrate crystallizes only after the transition point of the pentahydrate to decahydrate has been passed as the solution is cooled. The addition of the wash water serves a two-fold purpose. By crystallizing the borax below the transition point it is secured as the desired decahydrate and in a substantially pure form. If the quantity of water used to wash the glaserite crystals is insufficient for the purpose of diluting the borax filtrate to the desired degree a further quantity of fresh water may be added directly.

The recovery of borax is also conveniently expedited by employing the processes disclosed in the copending applications of Homer L. Robson, Ser. No. 332,564, filed January 14, 1929, of Robson and Woodward, Ser. No. 455,455, filed May 24, 1930, and of De Beau and Robson, Ser. No. 252,420, filed February 6, 1928, now Patent 1,821,092.

The liquor remaining after the borax has been removed is reheated and is recycled to wash the mixture of glaserite and borax. Before the liquor is reheated it is expedient that a quantity of it be discarded. This discard prevents the minor impurities such as carbonate and phosphate from accumulating and reaching a concentration in the wash liquor which would result in their precipitation during the process. The quantity of liquor discarded ordinarily is approximately equal to the quantity of fresh water added thereby keeping the volume of wash liquor nearly constant.

Where a mixture of sodium and potassium chloride is to be separated the mixed salts are preferably introduced into an agitator wherein they are sprayed with hot water at a temperature of approximately 75° C. The wet salts are then usually passed to an agitator where they are further contacted with the hot wash water and the potassium chloride dissolved. The mixture is then passed to a filter wherein pure sodium chloride crystals are separated from the wash liquor. The filtrate, consisting of substantially dissolved potassium chloride, is conveniently passed to a cooler wherein the potassium chloride is cooled and precipitated out as the result of the supersaturation of the solution with the decreasing temperature. After the potassium chloride has been removed, the remaining liquor, which is substantially saturated with sodium chloride, is heated and utilized to wash another mixture of sodium and potassium chloride. The wash liquor, which becomes saturated with sodium chloride, is thus utilized as a cyclic wash water to remove the potassium chloride from the sodium chloride. Little difficulty is experienced in precipitating the potassium chloride from the liquor since the solubility of sodium chloride varies so slightly with temperature changes. It is obvious that both this process and the process for treating the glaserite, borax and sodium chloride are cyclic.

In like manner it is possible to separate a mixture consisting essentially of glaserite, Burkeite $(2Na_2SO_4.Na_2CO_2)$ and sodium chloride into three simple pure salts. Other salt mixtures or other brines may be considered and their solubility characteristics utilized in effecting their separation into their respective components, as I have disclosed, without departing from the process herein disclosed.

I claim:

1. That step in the process of separating a mixture of crystallized salts including glaserite and borax which comprises contacting the mixture with hot water to dissolve the borax substantially out of the crystal mixture to leave substantially pure glaserite.

2. The process of separating a mixture of crystallized salts, including glaserite and borax, which consists in contacting the crystal mixture with water at approximately 75° C. to remove borax substantially entirely from the glaserite crystals, and then recovering the borax from the wash water.

3. The step in the process of separating a mixture of crystallized salts, including glaserite and borax, which consists in contacting the mixture with water at a temperature of about 75° C. to dissolve the borax substantially out of the crystal mixture to leave substantially pure glaserite.

In testimony whereof, I have hereunto set my hand.

HENRY TEYNHAM WOODWARD.